(12) United States Patent
Senoo

(10) Patent No.: US 10,008,866 B2
(45) Date of Patent: Jun. 26, 2018

(54) STORAGE BATTERY CONTROL METHOD AND STORAGE BATTERY CONTROL APPARATUS

(71) Applicant: Panasonic Intellectual Property Management Co., Ltd., Osaka (JP)

(72) Inventor: Daigo Senoo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 520 days.

(21) Appl. No.: 14/639,395

(22) Filed: Mar. 5, 2015

(65) Prior Publication Data

US 2015/0263546 A1    Sep. 17, 2015

(30) Foreign Application Priority Data

Mar. 14, 2014   (JP) ................................. 2014-051834

(51) Int. Cl.
*H02J 7/00* (2006.01)
*H02J 3/32* (2006.01)

(52) U.S. Cl.
CPC ............. *H02J 7/0021* (2013.01); *H02J 3/32* (2013.01)

(58) Field of Classification Search
CPC .................................................. H02J 7/0021

USPC ................................................. 320/134–136
See application file for complete search history.

(56) References Cited

U.S. PATENT DOCUMENTS

2013/0229057 A1   9/2013   Taima

FOREIGN PATENT DOCUMENTS

| JP | 2012-055027 | 3/2012 |
| JP | 2013-176226 | 9/2013 |
| JP | 2013-545181 | 12/2013 |
| WO | 2012/054540 | 4/2012 |
| WO | 2012/060321 A1 | 5/2012 |

*Primary Examiner* — Richard V Muralidar
(74) *Attorney, Agent, or Firm* — Greenblum & Bernstein, P.L.C.

(57) ABSTRACT

A storage battery control method includes receiving capacity information indicating chargeable and dischargeable capacities of a plurality of storage batteries; receiving use permission information indicating whether at least some of the plurality of storage batteries are available for the frequency control; determining target storage batteries to be used for the frequency control among storage batteries of the plurality of storage batteries indicated as available by the received use permission information; determining a bid capacity used for the frequency control, the bid capacity being equal to or less than a total value of the chargeable and dischargeable capacities of the target storage batteries; and submitting a bid for the frequency control under a bid condition including the bid capacity.

12 Claims, 9 Drawing Sheets

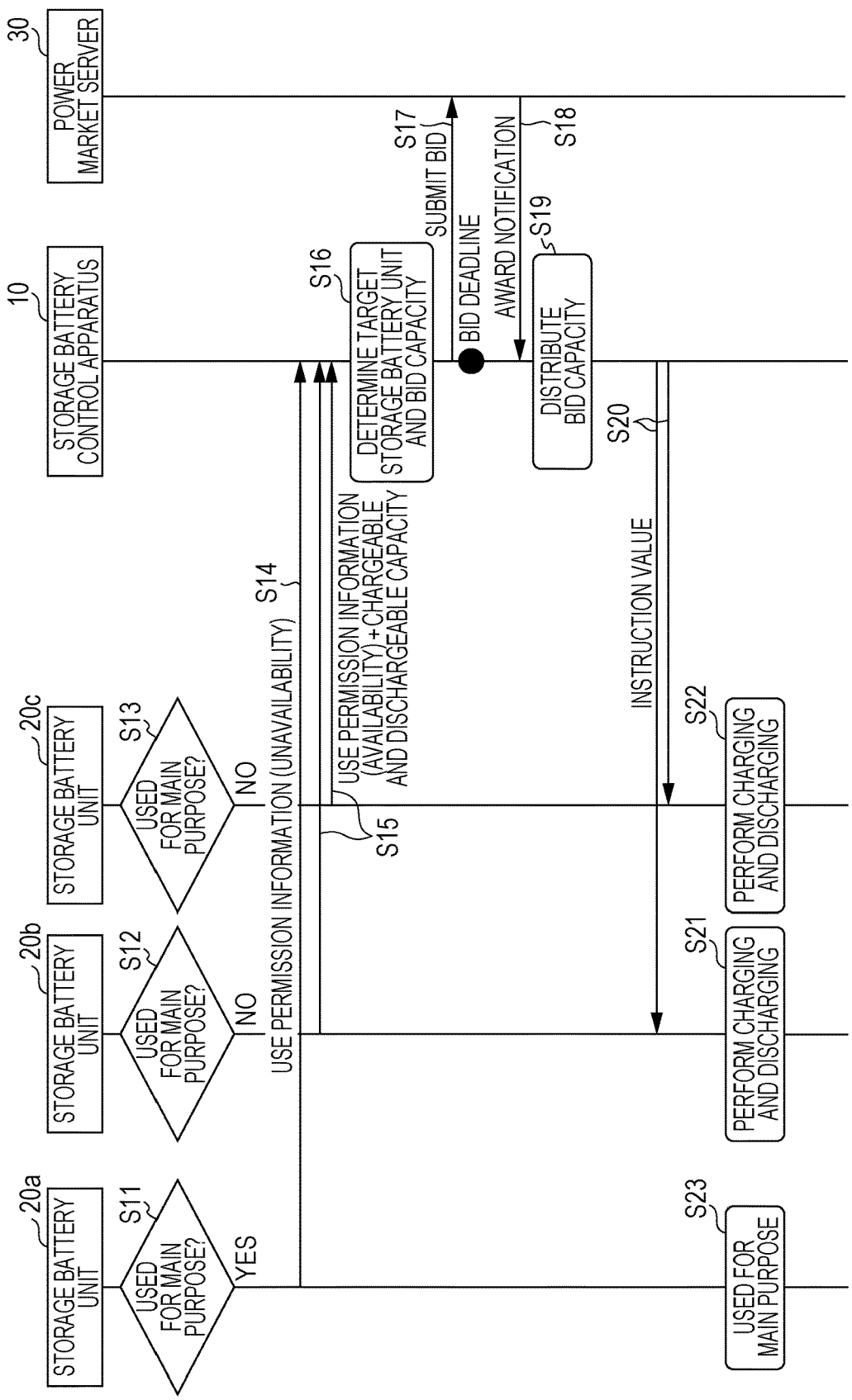

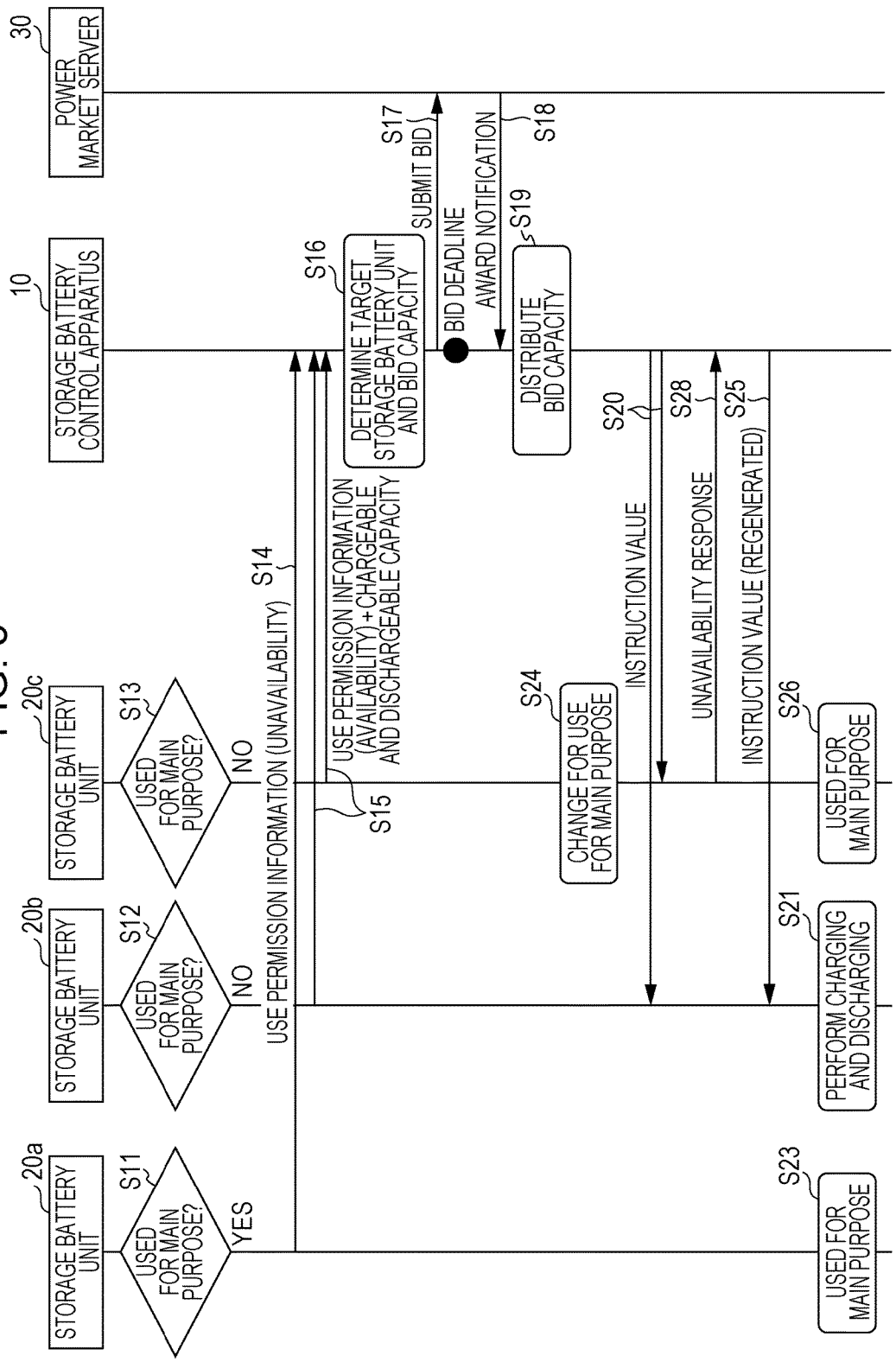

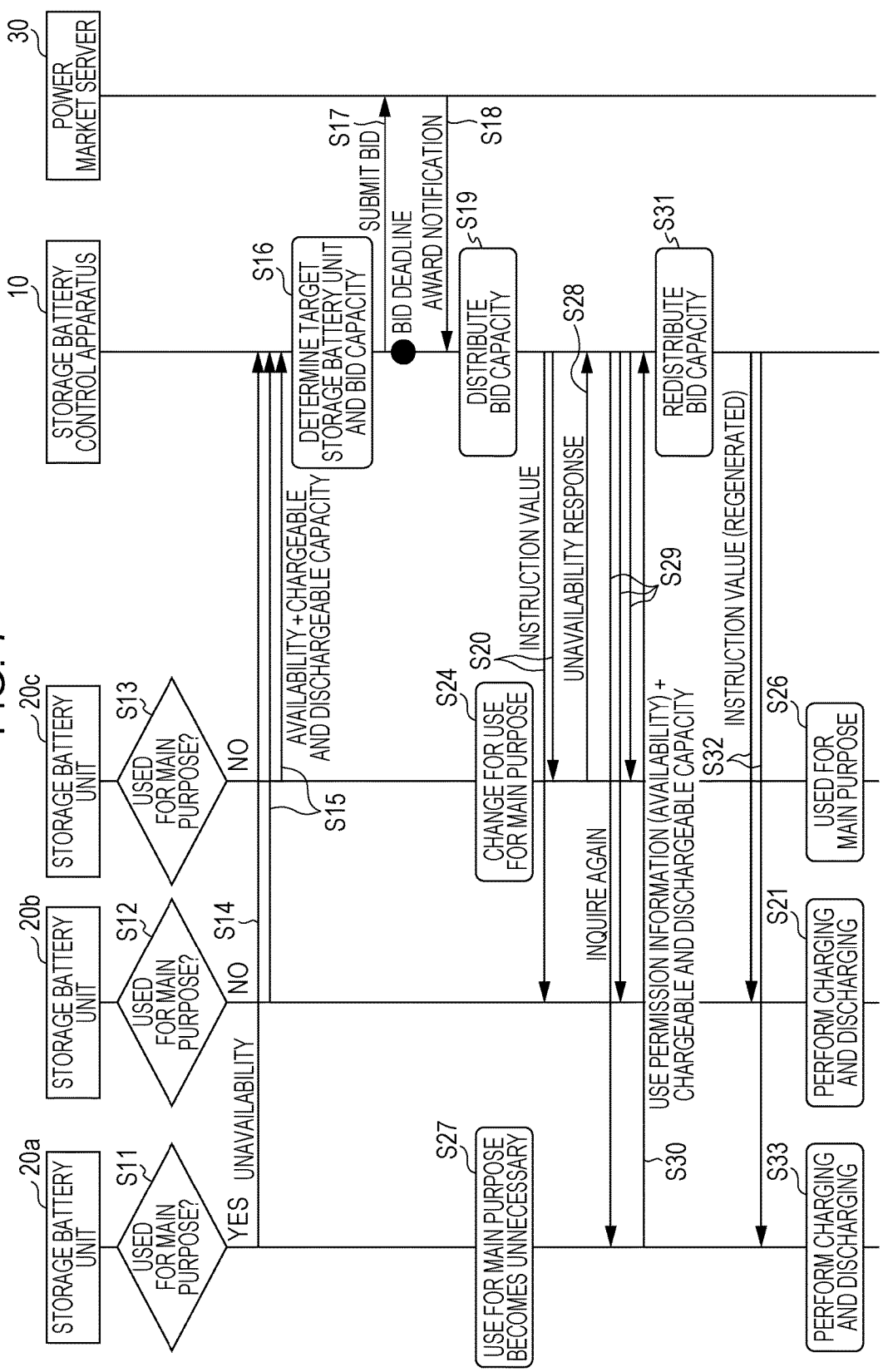

FIG. 8

| | FIRST PERIOD | SECOND PERIOD | THIRD PERIOD | FOURTH PERIOD | FIFTH PERIOD | SIXTH PERIOD |
|---|---|---|---|---|---|---|
| STORAGE BATTERY UNIT 20a | FR-ENABLED CHARGEABLE AND DISCHARGEABLE CAPACITY 30 kW | FR-ENABLED CHARGEABLE AND DISCHARGEABLE CAPACITY 30 kW | FR-ENABLED CHARGEABLE AND DISCHARGEABLE CAPACITY 30 kW | FR-ENABLED CHARGEABLE AND DISCHARGEABLE CAPACITY 30 kW | FR-ENABLED CHARGEABLE AND DISCHARGEABLE CAPACITY 30 kW | FR-ENABLED CHARGEABLE AND DISCHARGEABLE CAPACITY 30 kW |
| STORAGE BATTERY UNIT 20b | FR-ENABLED CHARGEABLE AND DISCHARGEABLE CAPACITY 30 kW | FR-ENABLED CHARGEABLE AND DISCHARGEABLE CAPACITY 30 kW | FR-ENABLED CHARGEABLE AND DISCHARGEABLE CAPACITY 30 kW | FR-DISABLED CHARGEABLE AND DISCHARGEABLE CAPACITY 30 kW | FR-DISABLED CHARGEABLE AND DISCHARGEABLE CAPACITY 30 kW | FR-ENABLED CHARGEABLE AND DISCHARGEABLE CAPACITY 30 kW |
| STORAGE BATTERY UNIT 20c | FR-ENABLED CHARGEABLE AND DISCHARGEABLE CAPACITY 30 kW | FR-ENABLED CHARGEABLE AND DISCHARGEABLE CAPACITY 30 kW | FR-ENABLED CHARGEABLE AND DISCHARGEABLE CAPACITY 30 kW | FR-ENABLED CHARGEABLE AND DISCHARGEABLE CAPACITY 30 kW | FR-ENABLED CHARGEABLE AND DISCHARGEABLE CAPACITY 30 kW | FR-ENABLED CHARGEABLE AND DISCHARGEABLE CAPACITY 30 kW |
| STORAGE BATTERY UNIT 20d | FR-ENABLED CHARGEABLE AND DISCHARGEABLE CAPACITY 30 kW | FR-ENABLED CHARGEABLE AND DISCHARGEABLE CAPACITY 30 kW | FR-ENABLED CHARGEABLE AND DISCHARGEABLE CAPACITY 30 kW | FR-ENABLED CHARGEABLE AND DISCHARGEABLE CAPACITY 30 kW | FR-ENABLED CHARGEABLE AND DISCHARGEABLE CAPACITY 30 kW | FR-ENABLED CHARGEABLE AND DISCHARGEABLE CAPACITY 30 kW |
| TOTAL OF CHARGEABLE AND DISCHARGEABLE CAPACITIES | 120 kW | 120 kW | 120 kW | 90 kW | 90 kW | 120 kW |
| MARGIN FOR ONE STORAGE BATTERY UNIT RESERVED | 90 kW | 90 kW | 90 kW | 60 kW | 60 kW | 90 kW |

FIG. 9

| | FIRST PERIOD | SECOND PERIOD | THIRD PERIOD | FOURTH PERIOD | FIFTH PERIOD | SIXTH PERIOD |
|---|---|---|---|---|---|---|
| STORAGE BATTERY UNIT 20a | FR-ENABLED CHARGEABLE AND DISCHARGEABLE CAPACITY 30 kW FR USE COUNT 5 | FR-ENABLED CHARGEABLE AND DISCHARGEABLE CAPACITY 30 kW FR USE COUNT 6 | FR-ENABLED CHARGEABLE AND DISCHARGEABLE CAPACITY 30 kW FR USE COUNT 7 | FR-ENABLED CHARGEABLE AND DISCHARGEABLE CAPACITY 30 kW FR USE COUNT 8 | FR-ENABLED CHARGEABLE AND DISCHARGEABLE CAPACITY 30 kW FR USE COUNT 9 | FR-ENABLED CHARGEABLE AND DISCHARGEABLE CAPACITY 30 kW FR USE COUNT 10 |
| STORAGE BATTERY UNIT 20b | *FR-ENABLED CHARGEABLE AND DISCHARGEABLE CAPACITY 30 kW FR USE COUNT 56* | *FR-ENABLED CHARGEABLE AND DISCHARGEABLE CAPACITY 30 kW FR USE COUNT 56* | *FR-ENABLED CHARGEABLE AND DISCHARGEABLE CAPACITY 30 kW FR USE COUNT 56* | FR-ENABLED CHARGEABLE AND DISCHARGEABLE CAPACITY 30 kW FR USE COUNT 56 | FR-ENABLED CHARGEABLE AND DISCHARGEABLE CAPACITY 30 kW FR USE COUNT 57 | FR-ENABLED CHARGEABLE AND DISCHARGEABLE CAPACITY 30 kW FR USE COUNT 57 |
| STORAGE BATTERY UNIT 20c | FR-ENABLED CHARGEABLE AND DISCHARGEABLE CAPACITY 30 kW FR USE COUNT 53 | FR-ENABLED CHARGEABLE AND DISCHARGEABLE CAPACITY 30 kW FR USE COUNT 54 | FR-ENABLED CHARGEABLE AND DISCHARGEABLE CAPACITY 30 kW FR USE COUNT 55 | *FR-ENABLED CHARGEABLE AND DISCHARGEABLE CAPACITY 30 kW FR USE COUNT 56* | *FR-ENABLED CHARGEABLE AND DISCHARGEABLE CAPACITY 30 kW FR USE COUNT 57* | FR-ENABLED CHARGEABLE AND DISCHARGEABLE CAPACITY 30 kW FR USE COUNT 57 |
| STORAGE BATTERY UNIT 20d | FR-ENABLED CHARGEABLE AND DISCHARGEABLE CAPACITY 30 kW FR USE COUNT 15 | FR-ENABLED CHARGEABLE AND DISCHARGEABLE CAPACITY 30 kW FR USE COUNT 16 | FR-ENABLED CHARGEABLE AND DISCHARGEABLE CAPACITY 30 kW FR USE COUNT 17 | FR-ENABLED CHARGEABLE AND DISCHARGEABLE CAPACITY 30 kW FR USE COUNT 18 | FR-ENABLED CHARGEABLE AND DISCHARGEABLE CAPACITY 30 kW FR USE COUNT 19 | FR-ENABLED CHARGEABLE AND DISCHARGEABLE CAPACITY 30 kW FR USE COUNT 20 |
| TOTAL OF CHARGEABLE AND DISCHARGEABLE CAPACITIES | 120 kW | 120 kW | 120 kW | 120 kW | 120 kW | 120 kW |
| MARGIN FOR ONE STORAGE BATTERY UNIT RESERVED | 90 kW | 90 kW | 90 kW | 90 kW | 90 kW | 90 kW |

STORAGE BATTERY CONTROL METHOD AND STORAGE BATTERY CONTROL APPARATUS

BACKGROUND

1. Technical Field

The present disclosure relates to a storage battery control method and a storage battery control apparatus.

2. Description of the Related Art

Recently, a system that performs the frequency control of an electric power system using storage batteries (storage battery system) has been studied.

Frequency control services are ancillary services that stabilize an electric power system by charging or discharging storage batteries based on an instruction value. Japanese Unexamined Patent Application Publication No. 2012-55027 discloses an ancillary services provision quantity evaluation apparatus that achieves efficient system operation by evaluating ancillary services.

Japanese Unexamined Patent Application Publication (Translation of PCT Application) No. 2013-545181 and Japanese Unexamined Patent Application Publication No. 2013-176226 are also examples of related art.

SUMMARY

However, in ancillary services that collectively use a plurality of storage batteries, it is not possible to perform highly reliable ancillary services based on the conditions and states of the storage batteries.

One non-limiting and exemplary embodiment provides a storage battery control method that can carry out ancillary services based on the capacities of storage batteries or the availability of storage batteries for ancillary services.

In one general aspect, the techniques disclosed here feature a storage battery control method, including receiving capacity information indicating chargeable and dischargeable capacities of a plurality of storage batteries, receiving use permission information indicating whether at least some of the plurality of storage batteries are available for the frequency control, determining target storage batteries to be used for the frequency control among storage batteries of the plurality of storage batteries indicated as available by the received use permission information, determining a bid capacity used for the frequency control, the bid capacity being equal to or less than a total value of the chargeable and dischargeable capacities of the target storage batteries, and submitting a bid for the frequency control under a bid condition including the bid capacity.

In the storage battery control method according to the present disclosure, barriers to entering frequency control services can be reduced.

It should be noted that general or specific embodiments may be implemented as a system, an apparatus, an integrated circuit, a computer program, a recording medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a sequence diagram showing the operation of the storage battery control system;

FIG. 5 is a sequence diagram when a storage battery control apparatus generates an instruction value again;

FIG. 7 is a sequence diagram showing an example of the operation of a storage battery control system in the situation shown in FIGS. 6A and 6B;

FIG. 8 shows an example in which a bid capacity is determined with the margin for one storage battery unit reserved; and FIG. 9 shows an example in which the bid capacity is distributed to storage battery units depending on the use count in frequency control services.

DETAILED DESCRIPTION

Figure 1:
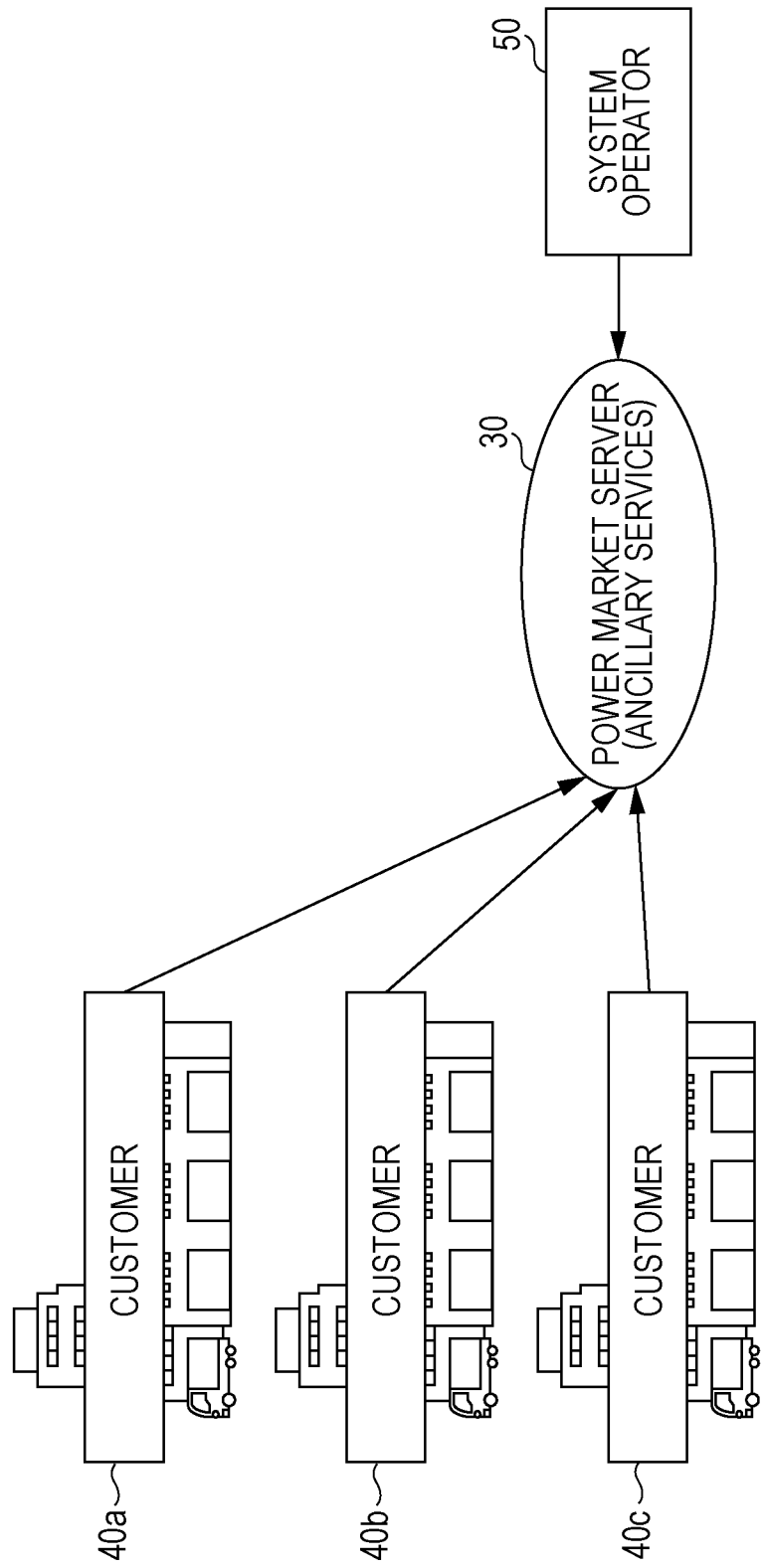
FIG. 1 is a diagrammatic view schematically showing frequency control services.

A storage battery control method according to an aspect of the present disclosure for a storage battery control apparatus includes receiving capacity information indicating chargeable and dischargeable capacities of a plurality of storage batteries receiving use permission information indicating whether at least some of the plurality of storage batteries are available for the frequency control, determining target storage batteries to be used for the frequency control among storage batteries of the plurality of storage batteries indicated as available by the received use permission information, determining a bid capacity used for the frequency control, the bid capacity being equal to or less than a total value of the chargeable and dischargeable capacities of the target storage batteries, and submitting a bid for the frequency control under a bid condition including the bid capacity.

When the bid for the frequency control is established, the bid capacity may be distributed to at least some of the target storage batteries.

After distributing the bid capacity, if some of the target storage batteries to which the bid capacity has been distributed become unavailable for the frequency control, the bid capacity may be redistributed to at least some of the plurality of storage batteries excluding the target storage batteries that have become unavailable.

The at least some of the plurality of storage batteries to which the bid capacity is redistributed may be the target storage batteries excluding the target storage batteries that have become unavailable.

The bid capacity may be determined to be a capacity a predetermined margin less than the total value of the chargeable and dischargeable capacities.

The bid capacity may be distributed depending on the number of the at least some of the target storage batteries.

The bid capacity may be distributed depending on service lives of the target storage batteries so that a target storage battery with a longer service life is provided with more of the bid capacity, the target storage battery being one of the target storage batteries.

The bid capacity may be distributed depending on frequencies at which the target storage batteries are used for the frequency control so that a target storage battery with a lower frequency for the frequency control is provided with more of the bid capacity, the target storage battery being one of the target storage batteries.

The bid capacity may be distributed depending on the chargeable and dischargeable capacities of the target storage batteries so that a target storage battery with a larger chargeable and dischargeable capacity is provided with more of the bid capacity, the target storage battery being one of the target storage batteries.

The chargeable and dischargeable capacities may be received before the use permission information is received.

The chargeable and dischargeable capacities may be received each time the use permission information is received.

The chargeable and dischargeable capacities set by a user of the storage batteries may be received.

The use permission information may indicate that each of the plurality of storage batteries is unavailable for the frequency control and storage batteries of the plurality of storage batteries from which the use permission information has not been received may be determined to be the target storage batteries.

The use permission information may indicate that each of the plurality of storage batteries is available for the frequency control and storage batteries of the plurality of storage batteries from which the use permission information has been received may be determined to be the target storage batteries.

The use permission information may indicate availability for the frequency control planned to be performed after a predetermined time.

The frequency control may be performed by charging and discharging the target storage batteries to which the bid capacity has been distributed.

A storage battery control apparatus according to an aspect of the present disclosure that performs frequency control of an electric power system, including one or more memories; and circuitry operative to: receive capacity information indicating chargeable and dischargeable capacities of a plurality of storage batteries; receive use permission information indicating whether at least some of the plurality of storage batteries are available for the frequency control; determine target storage batteries to be used for the frequency control among storage batteries of the plurality of storage batteries indicated as available by the received use permission information; determine a bid capacity used for the frequency control, the bid capacity being equal to or less than a total value of the chargeable and dischargeable capacities of the target storage batteries; and submit a bid for the frequency control under a bid condition including the bid capacity.

It should be noted that general or specific embodiments may be implemented as a system, an apparatus, an integrated circuit, a computer program, a recording medium, or any selective combination thereof.

Embodiments will be specifically described below with reference to the drawings.

Any of the embodiments described below indicate comprehensive or specific examples. The values, shapes, materials, components, placement positions and connection geometries of components, steps, order of steps, and the like are only examples and do not restrict the present disclosure. Of the components in the following embodiments, the components not included in the independent claim indicating the most generic concept are described as optional components.

Embodiment 1

[About Frequency Control Services]

First, frequency control services will be described. FIG. 1 is a diagrammatic view schematically showing frequency control services.

A customer 40a (for example, a business operator of power plant or the like) submits bid information to a power market server 30 in advance. Specifically, the bid information includes, for example, a time slot, which is a period for providing frequency control services, and a bid capacity used for frequency control in the time slot. The bid capacity is the chargeable and dischargeable capacity of a power storage apparatus (storage battery unit) reserved by the customer 40a to provide frequency control services.

A plurality of customers (customers 40a, 40b, and 40c in the example in FIG. 1) submit bids to the power market server 30 and a system operator 50 selects the bid information required for the frequency control of the electric power system from the plurality of pieces of bid information and accepts the bid.

If the bid is established, the customer 40a performs charging or discharging at the start time of the time slot targeted for the bid depending on an instruction value within the range of the bid capacity. As a result, the compensation for frequency control services is paid to the customer. The compensation for frequency control services depends on, for example, the bid capacity reserved for frequency control services. If frequency control services are not provided appropriately, a penalty needs to be paid.

[System Structure]

Figure 2:
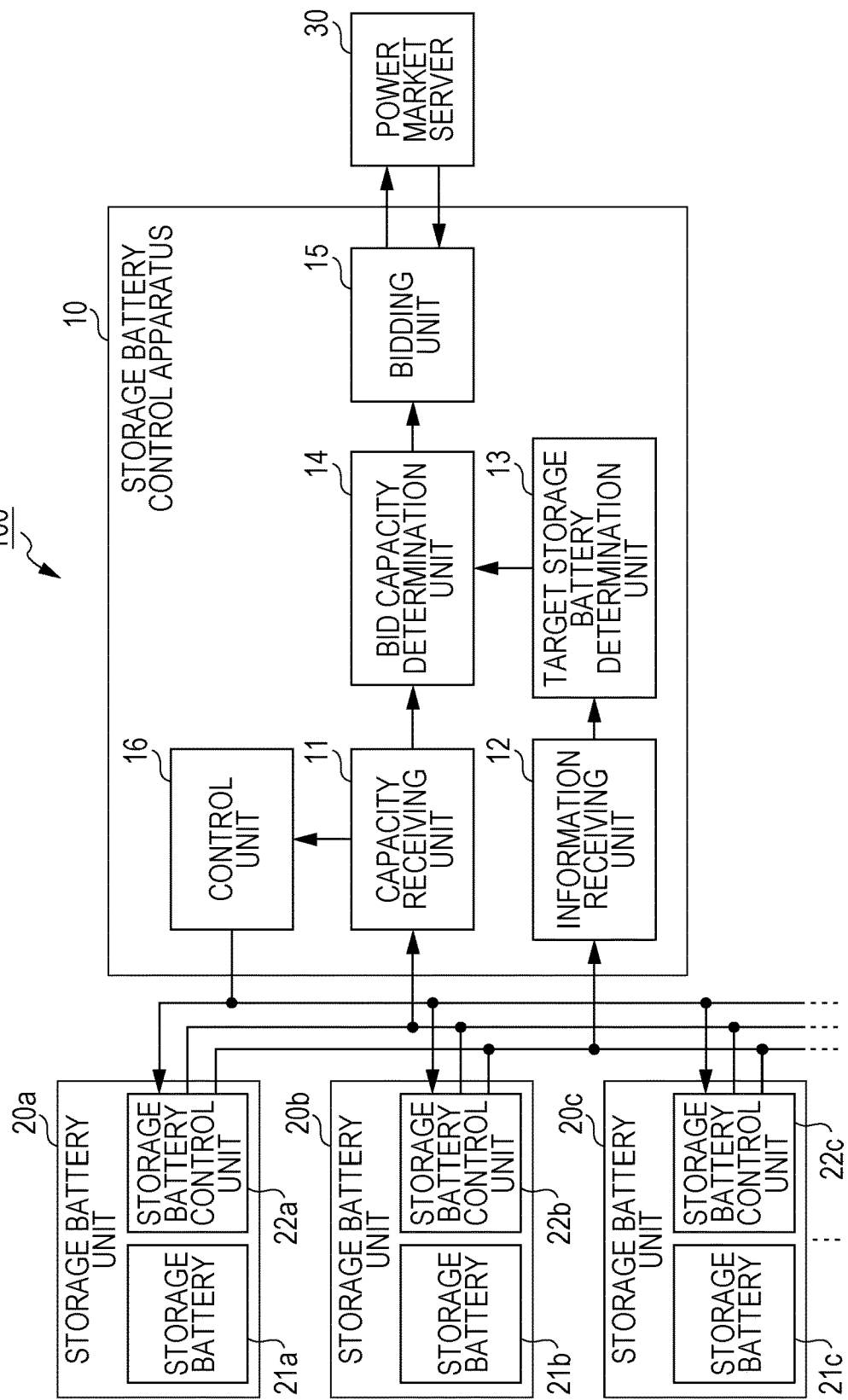
FIG. 2 is a block diagram showing the system structure of a storage battery control system according to embodiment 1.

The structure of a storage battery control system according to embodiment 1 premised on the above frequency control services (frequency control) will be described. FIG. 2 is a block diagram showing the system structure of the storage battery control system according to embodiment 1.

As shown in FIG. 2, the storage battery control system 100 includes a storage battery control apparatus 10 and a plurality of storage battery units 20a, 20b, and 20c. The number of the storage battery units shown in FIG. 2 is only an example.

First, the storage battery control apparatus 10 will be described.

The storage battery control apparatus 10 includes a capacity receiving unit 11, an information receiving unit 12, a target storage battery determination unit 13, a bid capacity determination unit 14, a bidding unit 15, and a control unit 16.

The capacity receiving unit 11 receives the chargeable and dischargeable capacities of the plurality of storage battery units 20a, 20b, and 20c placed dispersedly. The capacity receiving unit 11 is specifically a communication module that receives the chargeable and dischargeable capacities from the storage battery units via a wired or wireless communication network.

The chargeable and dischargeable capacity is represented as, for example, "30 kW". When a storage battery unit has a chargeable and dischargeable capacity of 30 kW, the storage battery unit reserves a charging capability of up to 30 kW and a discharging capability of up to 30 kW for frequency control services.

The chargeable and dischargeable capacity received by the capacity receiving unit 11 does not necessarily represent the maximum capacity (maximum chargeable-dischargeable capacity) that can be charged to or discharged from the storage battery unit 20a. The chargeable and dischargeable capacity is set, for example, by the manager of the storage battery unit 20a within the maximum chargeable-dischargeable capacity of the storage battery unit 20a.

The chargeable and dischargeable capacity is determined depending on the state of charge (SOC) of a storage battery unit. This is because the maximum chargeable capacity and the maximum dischargeable capacity vary depending on the state of charge.

The information receiving unit 12 receives use permission information indicating whether the storage batteries are available for the frequency control from at least some of the plurality of storage battery units 20a, 20b, and 20c. The information receiving unit 12 is specifically a communication module that receives the use permission information from the storage battery units via a wired or wireless communication network. More specifically, the use permission information indicates whether a storage battery unit is available for frequency control services planned to be performed after a predetermined time.

The target storage battery determination unit 13 determines target storage battery units to be used for frequency control services based on the use permission information received by the information receiving unit 12 among the plurality of storage battery units 20a, 20b, and 20c.

The bid capacity determination unit 14 determines the bid capacity, used for frequency control, that is equal to or less than the total value of the chargeable and dischargeable capacities of target storage battery units determined by the target storage battery determination unit 13.

The bidding unit 15 submits a bid for frequency control services to the power market server 30 under a bid condition including a bid capacity determined by the bid capacity determination unit 14. The bid by the bidding unit 15 is submitted mechanically by an instruction from a computer.

A control unit 16 controls the charging and discharging of the target storage battery units. Specifically, the control unit 16 distributes the bid capacity to the target storage battery units, generates an instruction value, used to control the charging and discharging of the target storage battery units, that depends on the distributed bid capacity, and sends the generated instruction value to the storage battery units 20a to 20c. The instruction value is generated by detecting the frequency of the electric power system.

As described above, the control unit 16 charges and discharges the target storage batteries to which the bid capacity has been distributed to carry out frequency control (frequency control services). The storage battery unit 20a performs charging or discharging based on the instruction value.

Next, the storage battery units 20a, 20b, and 20c will be described. Although only the storage battery unit 20a will be described below, the storage battery units 20b and 20c also have the same structure.

The storage battery unit 20a is an apparatus that has the storage battery 21a and a storage battery control unit 22a and has a function of charging and discharging electric power. The storage battery unit 20a is placed, for example, in a customer. The storage battery unit 20a is disposed in a customer generally for an emergency power source during power interruption or peak cut.

Peak cut is control made to suppress the power consumption of a load belonging to a customer so that power consumption in the customer becomes equal to or less than predetermined contract power demand. Peak cut here means the suppression of the electric power from the electric power system by a load by supplying electric power charged in the storage battery unit 20a to the load in time periods such as mainly in evening time when the power demand of the electric power system increases.

Specifically, the storage battery 21a is, but not limited to, a secondary battery (storage battery) such as a lead storage battery, lithium ion battery, or redox flow battery.

The storage battery control unit 22a carries out the frequency control services (frequency control) of the electric power system by controlling the charging and discharging of the storage battery 21a. Specifically, the storage battery control unit 22a charges or discharges the storage battery 21a based on an instruction value received from the control unit 16 of the storage battery control apparatus 10. In addition, the storage battery control unit 22a sends a chargeable and dischargeable capacity and use permission information to the storage battery control apparatus 10.

Next, the power market server 30 will be described. The power market server 30 is an apparatus that manages the ancillary services market (frequency regulation market). The power market server 30 is managed by, for example, a manager or the like who manages the ancillary services market.

[Overview of the Operation of the Storage Battery Control System]

Figure 3:
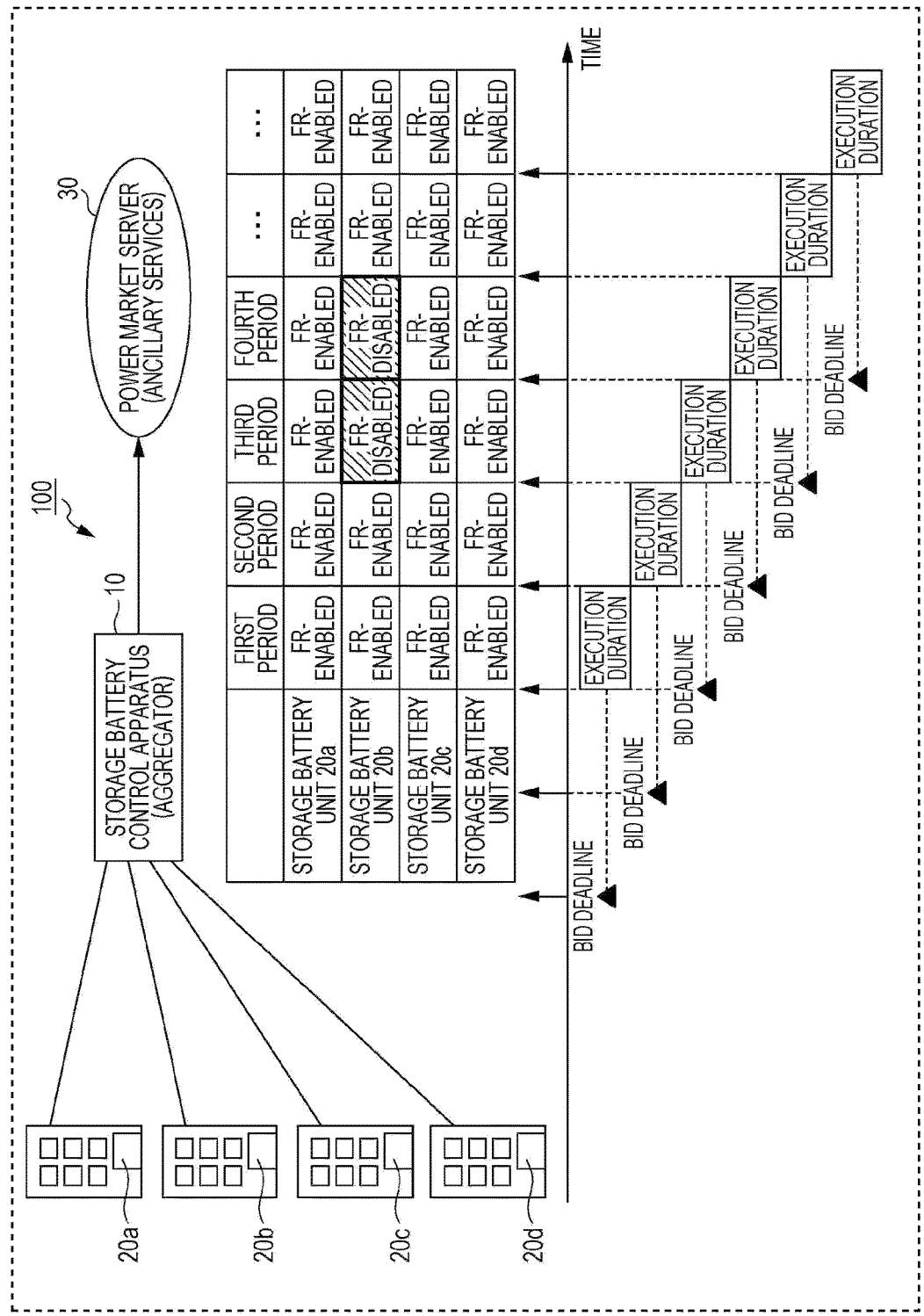
FIG. 3 schematically shows a storage battery control method.

Next, an overview of the operation of the storage battery control system 100 will be described. FIG. 3 schematically shows a storage battery control method. FIG. 3 shows an example in which the storage battery control system 100 lodes four storage battery units (storage battery units 20a, 20b, 20c, and 20d).

As shown in FIG. 3, a duration (execution duration) for which frequency control services are planned to be carried out is disposed in each of time slots (the first period, the second period, ... ). A bid deadline is set at the time point a predetermined time (two time slots in the example in FIG. 3) before the execution duration.

The storage battery control apparatus 10 receives use permission information and a chargeable and dischargeable capacity from each of the storage battery units before the bid deadline. Then, the storage battery control apparatus 10 determines the bid capacity equal to or less than the total of chargeable and dischargeable capacities of storage battery units indicated as available (indicated as FR-ENABLED in FIG. 3) by the use permission information and submits a bid to the power market server 30 by the bid deadline.

For example, in FIG. 3, for the frequency control services planned to be carried out in the first period and the second period, use permission information indicating availability has been received from all of the storage battery units 20a, 20b, 20c, and 20d.

Accordingly, for the frequency control services planned to be carried out in the first period and the second period, the storage battery control apparatus 10 determines the bid capacity equal to or less than the total of the chargeable and dischargeable capacities of the storage battery units 20a, 20b, 20c, and 20d and submits a bid.

On the other hand, for example, in FIG. 3, for the frequency control services planned to be carried out in the third period and the fourth period, use permission information indicating availability has been received from the storage battery units 20a, 20c, and 20d. In contrast, use permission information indicating unavailability (indicated as FR-DISABLED in FIG. 3) has been received from the storage battery unit 20b.

Accordingly, for the frequency control services planned to be carried out in the third period and the fourth period, the storage battery control apparatus 10 determines the bid capacity equal to less than the total of the chargeable and dischargeable capacities of the storage battery units 20a, 20c, and 20d and submits a bid.

As described above, the storage battery control apparatus 10 aggregates the chargeable and dischargeable capacities of a plurality of storage battery units and submits a bid in a collective manner to the power market server 30. At this time, even when ancillary services are carried out with a plurality of storage battery units aggregated, the ancillary services can be carried out based on the capacity and the availability for the ancillary services of each of the storage batteries.

[Details of the Operation of the Storage Battery Control System]

Next, details of the operation of the storage battery control system 100 as described above will be described with reference to a sequence diagram. FIG. 4 is a sequence diagram of the operation of the storage battery control system 100. In FIG. 4, the storage battery control system 100 includes three storage battery units (storage battery units 20*a*, 20*b*, and 20*c*) as an example.

First, each of the storage battery units determines whether the storage battery unit is used for the main purpose in the time slots targeted for frequency control services (S11 to S13). The main purpose means the supply of electric power from the storage battery unit to the customer n which the storage battery unit is disposed and, more specifically, peak cut using the storage battery unit. The determination (determination as to whether use permission information indicates availability) in steps S11 to S13 may be made depending on determination as to whether peak cut is performed in the time slot (which is determined based on the prediction about loads of the customer) or may be made manually by the user (manager or operator) of each storage battery unit.

When the storage battery unit is used for the main purpose, the storage battery unit sends use permission information indicating unavailability to the storage battery control apparatus 10. In the example in FIG. 4, the storage battery unit 20*a* determines that the storage battery unit is used for the main purpose (Yes in S11) and sends use permission information indicating unavailability to the storage battery control apparatus 10 (S14).

In contrast, when the storage battery unit is not used for the main purpose, the storage battery unit sends use permission information indicating availability and the chargeable and dischargeable capacity to the storage battery control apparatus 10. In the example in FIG. 4, the storage battery units 20*b* and 20*c* determine that the storage battery units are not used for the main purpose (No in S12 and No in S13) and send use permission information indicating availability and the chargeable and dischargeable capacity to the storage battery control apparatus 10 (S15). The chargeable and dischargeable capacity may be set by the user (manager or operator) of the storage battery units.

The storage battery control apparatus 10 determines the target storage battery units and the bid capacity (S16). Specifically, the target storage battery determination unit 13 determines the storage battery units 20*b* and 20*c* as the target storage battery units among the storage battery units 20*a*, 20*b*, and 20*c* based on the received use permission information. Then, the bid capacity determination unit 14 determines a bid capacity equal to or less than the total value of the chargeable and dischargeable capacities f the storage battery units 20*b* and 20*c* (target storage batteries). Next, the bidding unit 15 of the storage battery control apparatus 10 submits a bid for frequency control services to the power market server 30 by the bid deadline (S17).

When the bid for frequency control service is established and an award notification received from the power market server 30 (S18), the control unit 16 of the storage battery control apparatus 10 distributes the bid capacity to at least some of the target storage batteries (S19). In the example in FIG. 3, the bid capacity is distributed to the storage battery units 20*b* and 20*c*, which are all of the target storage battery units. When the time slot for which the bid has been established is reached, the control unit 16 generates the instruction values of the storage battery unit 20*b* and 20*c* depending on the distributed amount of the bid capacity and sends the generated instruction values to the storage battery units 20*b* and 20*c*, respectively (S20). The instruction values are sent at predetermined time intervals (for example, every five seconds) from the start time to the end time of the frequency control services.

Upon receiving the instruction value, the storage battery control unit of the storage battery unit charges or discharges the storage battery in accordance with the instruction value. Specifically, the storage battery control units 22*b* and 22*c* charge or discharge the storage batteries 21*b* and 21*c* in accordance with the instruction values (S21 and S22). On the other hand, the storage battery unit 20*a* is used for the main purpose in the time slot (S23).

As described above, the storage battery control apparatus 10 aggregates the chargeable and dischargeable capacities of a plurality of storage battery units and submits a bid to the power market server 30 in a collective manner.

After distribution of the bid capacity, some of the target storage batteries may become unavailable for the frequency control services. In this case, the storage battery control apparatus 10 generates an instruction value again depending on reduction in the number of target storage batteries.

Regeneration of an instruction value by the storage battery control apparatus 10 will be described below. FIG. 5 is a sequence diagram when the storage battery control apparatus 10 generates an instruction value again. In FIG. 5, the descriptions of steps substantially the same as in FIG. 4 may be omitted.

In the sequence diagram shown in FIG. 5, the storage battery unit 20*c* sends use permission information indicating availability and a chargeable and dischargeable capacity to the storage battery control apparatus 10 (S15) and then the storage battery unit 20*c* is changed so as to be used for the main purpose (S24).

Then, when an instruction value is sent from the storage battery control apparatus 10 (S20), the storage battery unit 20*c* makes a response (unavailability response) indicating that the storage battery 21*c* is unavailable for the frequency control services.

Upon receiving the unavailability response, the storage battery control apparatus 10 generates an instruction value again and sends the generated instruction value to the storage battery unit 20*b* (S25). As a result, the storage battery unit 20*b* is used for frequency control services (S21) and the storage battery units 20*a* and 20*c* are used for the main purpose (S23 and S26).

The response (unavailability response) indicating that the storage battery 21*c* is unavailable for the frequency control services may be sent to the storage battery control apparatus 10 when the storage battery unit 20*c* is changed so as to be used for the main purpose, not when the instruction value is sent from the storage battery control apparatus 10. In addition, use permission information indicating unavailability may be set instead of an unavailability response.

In consideration of a situation as shown in FIG. 5, the bid capacity is preferably determined to be a capacity a predetermined margin (for example, the capacity for one storage battery unit) less than the total value of chargeable and dischargeable capacities. This is because the reliability of frequency control services can be improved if the bid capacity is determined to be a value that can be covered only by the storage battery unit 20*b* in a situation as shown in FIG. 5.

Since the storage battery units are placed dispersedly in the storage battery control system 100, all of the storage battery units hardly become unavailable due to a system failure or the like. That is, in the storage battery control system 100, the reliability of frequency control services can be improved by risk management that makes use of dispersed placement.

When, for example, the bid capacity is determined with a margin taken as described above, even if some of the storage battery units become unavailable for the frequency control services after distribution of the bid capacity, the storage battery control apparatus 10 may redistribute the bid capacity to storage batteries excluding the unavailable storage batteries. Some of the storage battery units may become available after determination of the bid capacity. In such a case, the redistribution of the bid capacity is effective.

Figure 6A:
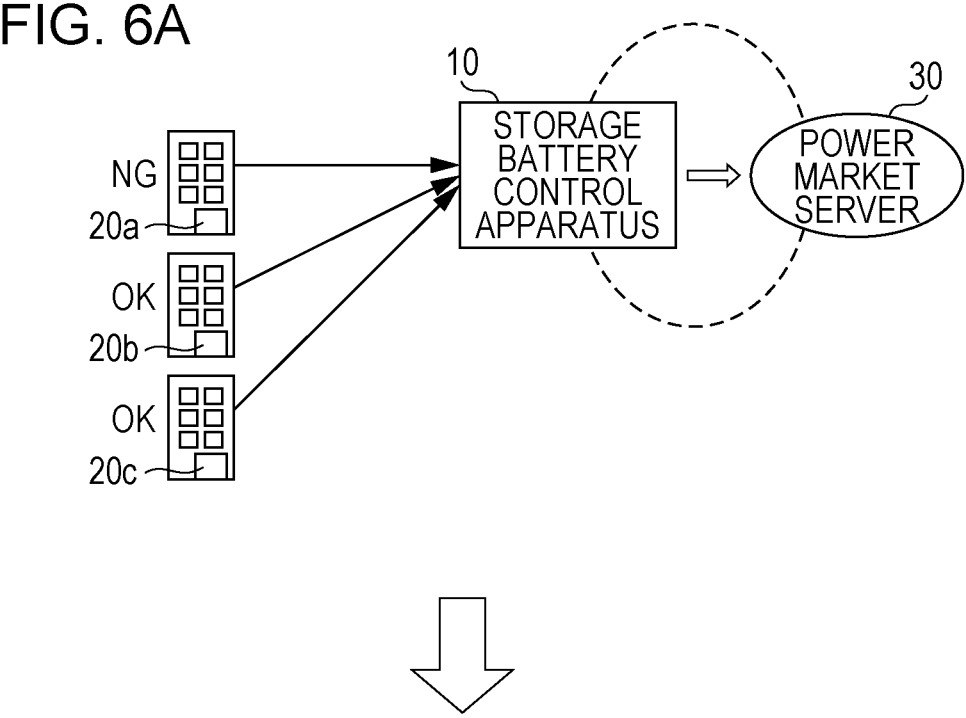
FIGS. 6A and 6B are diagrammatic views showing a situation in which storage battery units available for frequency control services are increased or reduced.
Figure 6B:
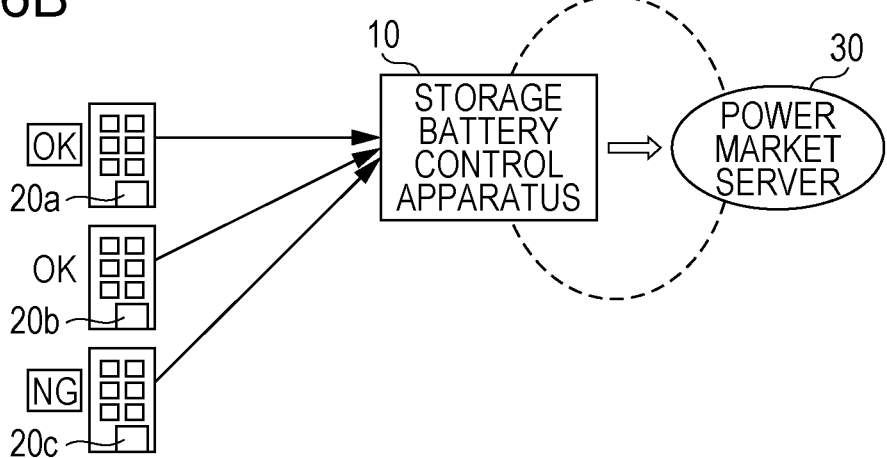

A situation different from that in FIG. 5 will be described with reference to FIGS. 6A and 6B. FIGS. 6A and 6B are diagrammatic views shoving a situation in which storage battery units available for frequency control services are increased or reduced.

In the situation shown in FIGS. 6A and 6B, the storage battery units 20b and 20c originally send use permission information indicating availability (FIG. 6A).

After that, the storage battery unit 20c is changed so as to be used for the main purpose. Although the storage battery unit 20a originally sends use permission information indicating unavailability, the storage battery unit 20a becomes available for frequency control services (FIG. 6B).

In such a situation, the storage battery control apparatus 10 redistributes the bid capacity to improve the reliability of frequency control services. FIG. 7 is a sequence diagram showing an example of the operation of the storage battery control system 100 in the situation shown in FIGS. 6A and 6B. In FIG. 7, the descriptions of steps substantially the same as in FIGS. 4 and 5 may be omitted.

In the sequence diagram shown in FIG. 7, after sending use permission information indicating unavailability (S14), the storage battery unit 20a becomes unnecessary to be used for the main purpose (S27).

After sending use permission information indicating availability and the chargeable and dischargeable capacity to the storage battery control apparatus 10 (S15), the storage battery unit 20c is changed so as to be used for the main purpose (S24).

After that, if the storage battery control apparatus 10 sends an instruction value (S20), the storage battery unit 20c makes an unavailability response.

Upon receiving the unavailability response, the storage battery control apparatus 10 inquires of the storage battery units again (S29) and, in response to this, the storage battery unit 20a sends the use permission information indicating availability and the chargeable and dischargeable capacity to the storage battery control apparatus 10 (S30).

The storage battery control apparatus 10 redistributes the bid capacity to the storage battery units 20a and 20b (S31) and sends an instruction value that depends on the redistribution to the storage battery units 20a and 20b (S32). As a result, the storage battery units 20a and 20b are used for frequency control services (S33 and S21) and the storage battery unit 20c is used for the main purpose (S26).

As described above, the storage battery control system 100 generates an instruction value again or redistributes the bid capacity depending on the situation, thereby improving the reliability of frequency control services.

Such a system as described in FIG. 1 has a risk in which a single system failure in a customer may make most of the storage battery units belonging to the customer unavailable, thereby disabling provision of frequency control services. The storage battery control system 100 hardly has such a risk.

[Determination and Distribution of a Bid Capacity]

There are many variations in the method for distributing the bid capacity. Generally, the larger the bid capacity, the larger the compensation (incentive) obtained. Accordingly, in terms of the compensation obtained, the bid capacity is preferably determined to be the total of chargeable and dischargeable capacities.

However, in terms of the risk management as described above, the bid capacity is preferably determined to be a capacity a predetermined margin (for example, the capacity for one storage battery unit) less than the total value of chargeable and dischargeable capacities. FIG. 8 shows an example in which the bid capacity is determined with the margin for one storage battery unit reserved. In FIG. 8, the chargeable and dischargeable capacity of each of the storage battery units (storage battery units 20a to 20d) is 30 kW.

In the example in FIG. 8, the bid capacity is determined to be a capacity the capacity of one storage battery unit less than the total value of chargeable and dischargeable capacities. For example, four storage battery units are available (indicated as FR-ENABLED in FIG. 8) for frequency control services in the first to third periods and the sixth period. Accordingly, the bid capacity is determined to be 90 kW, which is obtained by reserving the margin (30 kW) of one storage battery unit with respect to the total (120 kW) of chargeable and dischargeable capacities.

In the fourth period and the fifth period, the storage battery unit 20b of the four storage battery units is unavailable (indicated as FR-DISABLED in FIG. 8) for frequency control services. Accordingly, the bid capacity is determined to be 60 kW, which is obtained by reserving the margin (30 kW) of one storage battery unit with respect to the total (90 kW) of chargeable and dischargeable capacities.

When the minimum unit (for example, 100 kW) of the bid capacity is determined, the bid capacity may be determined to be a value that is less than the total value of chargeable and dischargeable capacities and satisfies the minimum unit.

Here, distribution of the bid capacity will be described. Typically, the bid capacity determined as described above is distributed depending on the number of target storage battery units (storage battery units available for frequency control services). Specifically, for example, in the first period in FIG. 8, a capacity of 22.5 kW, which is obtained by dividing the bid capacity (90 kW) by the number (4) of target storage battery units, is distributed to each of the storage battery units.

In terms of risk reduction, the bid capacity may be distributed to only three of the four target storage battery units. That is, the bid capacity only needs to be distributed to at least some of the target storage battery units. As described above, the risk of disabling the provision of frequency control services may be reduced by reserving some target storage battery units in a preparative manner.

Although the chargeable and dischargeable capacity of each of the target storage battery units (storage battery units) is 30 kW in the example in FIG. 8, the chargeable and dischargeable capacity generally differs for each of the storage battery units. Accordingly, the bid capacity may be distributed depending on the chargeable and dischargeable capacity. Specifically, more of the bid capacity may be distributed to a target storage battery unit with a more chargeable and dischargeable capacity.

The bid capacity may be distributed depending on, for example, the frequency (use count) at which a storage battery is used for frequency control services. FIG. 9 shows an example in which the bid capacity is distributed to storage battery units depending on the use count in frequency control services.

In FIG. 9, the chargeable and dischargeable capacity of each of the storage battery units (storage battery units 20a to 20d) is 30 kW. In the example in FIG. 9, it is assumed that a storage unit (not shown) of the storage battery control apparatus 10 stores the history of frequency control services carried out by the storage battery control apparatus 10, that is, the number (indicated as FR USE COUNT in FIG. 9) of times the storage battery unit were used for frequency control services.

In the example in FIG. 9, the bid capacity is determined to be a capacity (90 kW) the capacity of one storage battery unit less than the total value (120 kW) of chargeable and dischargeable capacities, as in FIG. 8. In the distribution of the bid capacity, none of the bid capacity is distributed to only one storage battery unit.

In FIG. 9, at the start time of the first period, the FR use counts of the storage battery units 20a, 20b, 20c, and 20d are 5 times, 56 times, 53 times, and 15 times, respectively. Accordingly, the bid capacity in the first period is distributed to the storage battery units by 30 kW for each, except the storage battery unit 20b having the largest FR use count. The bid capacity is distributed similarly in the second period and the third period.

At the start time of the fourth period, the FR use counts of the storage battery units 20a, 20b, 20c, and 20d are 8 times, 56 times, 56 times, and 18 times, respectively. At the start time of the fourth period, the storage battery units 20b and 20c have the largest FR use count. Although any of these two storage battery units may be excluded from the distribution targets in this case, 30 kW is distributed to each of the storage battery units except, for example, the storage battery unit 20c.

At the start time of the fifth period, the FR use counts of the storage battery units 20a, 20b, 20c, and 20d are 9 times, 57 times, 56 times, and 19 times, respectively. Accordingly, the bid capacity in the fifth period is distributed to the storage battery units by 30 kW for each, except the storage battery unit 20b having the largest FR use count. The bid capacity is distributed similarly in the subsequent time slots.

A storage battery unit with a larger FR use count is considered to be degraded more. If the degradation of a storage battery progresses due to excess use in frequency control services, there may be a trouble such as reduction in use time when the storage battery is used for the main purpose. Such troubles can be suppressed by distributing the bid capacity depending on the use count in frequency control services.

The bid capacity is not distributed to the storage battery unit with the largest FR use count in the example in FIG. 9. However, if more of the bid capacity is distributed to a storage battery unit with a lower frequency (lower use count) of use for frequency control services, the above troubles can be suppressed.

The bid capacity may be distributed depending on the service life of a storage battery unit (storage battery) to suppress such troubles.

A known index for determining the service life (degree of degradation) of a storage battery is the state of health (SOH). The storage battery control apparatus 10 (control unit 16) receives SOH from storage battery units and, depending on the SOH, can distribute the bid capacity.

Also in this case, if more of the bid capacity is distributed to a storage battery unit with a longer service life (low SOH=not degraded), the above troubles can be suppressed.

Summary

As described above, the storage battery control apparatus 10 according to embodiment 1 aggregates the chargeable and dischargeable capacities of a plurality of storage battery units into a bid capacity based on the capacities and availability for ancillary services of the storage batteries, and submits a bid to the power market server 30. This enables the control of the storage batteries depending on the situations and states of the storage batteries.

Since the storage battery units are placed dispersedly in the storage battery control system 100, all of the storage battery units hardly become unavailable for frequency control services due to a system failure or the like. In the storage battery control apparatus 10, the reliability of frequency control services can be improved by making use of dispersed placement.

Other Embodiments

As described above, embodiment 1 has been described as an example of the technique disclosed in the present disclosure. However, the technique in the present disclosure is not limited to embodiment 1 and the technique is applicable to an embodiment to which a change, replacement, addition, omission, or the like has been made as appropriate. In addition, a new embodiment can be achieved by combining components described in embodiment 1.

For example, in the above embodiment, use permission information is sent regardless of whether the storage battery unit is available or unavailable for frequency control services. However, use permission information may be sent only when the storage battery unit is unavailable for frequency control services.

In this case, use permission information indicates unavailability (prohibition of use) of the storage battery unit for frequency control services. In this case, the target storage battery determination unit 13 determines the storage battery units of the plurality of storage battery units from which use permission information has not been received, to be target storage battery units.

Alternatively, use permission information may be sent only when the storage battery unit is available for frequency control services. In this case, use permission information indicates availability of a storage battery unit (allowance of use) for frequency control services. In this case, the target storage battery determination nit 13 determines the storage battery units of the plurality of storage battery units from which use permission information has been received, to be target storage battery units.

In the above structure, a customer n which a storage battery unit is disposed has an advantage of omitting an effort to send use permission information.

In the above embodiment, the chargeable and dischargeable capacity is received each time use permission information is received. However, the chargeable and dischargeable capacity may be determined under contract or the like and may be stored in a storage unit of the storage battery control apparatus 10 in advance. In this case, the chargeable and dischargeable capacity may be received (only once) in order to be stored in the above storage unit before use permission information is received. In this case, the chargeable and dischargeable capacity is sent from the storage battery unit only when it is changed.

Although the storage battery control apparatus 10 (control unit 16) generates an instruction value in the above embodiments, another apparatus may generate an instruction value. For example, the storage battery unit may detect the frequency of an electric power system and generate an instruction value or the system operator 50 (system operation server) may detect the frequency and generate an instruction value.

In the above embodiments, the components may be configured by specific hardware or may be achieved by executing the software programs corresponding to the components. The components may be achieved by causing a program execution nit such as a CPU or processor to read and execute a software program recorded in a recording medium such as a hard disk or semiconductor memory.

Although storage battery control apparatuses and storage battery control methods according to or e or more aspects have been described above based on embodiments, the present disclosure is not limited to these embodiments. Embodiments obtained by applying various modifications thought by those skilled in the art to the these embodiments or embodiments configured by combining components of different embodiments may be included in the scope of the one or more aspects without departing from the spirit of the present disclosure.

For example, the processing performed by a specific processing unit in the above embodiments may be performed by another processing unit. The order of a plurality pieces of processing may be changed or a plurality pieces of processing may be executed in parallel.

The present disclosure is useful as a storage battery control method for carrying out ancillary services based on the capacities or the availability for ancillary services of storage batteries.

What is claimed is:

1. A storage battery control method comprising:
   receiving capacity information indicating chargeable and dischargeable capacities of a plurality of storage batteries;
   receiving use permission information indicating whether at least some of the plurality of storage batteries are available for frequency control;
   determining target storage batteries to be used for the frequency control, from the at least some of the plurality of storage batteries indicated as available by the received use permission information;
   determining a bid capacity used for the frequency control, the bid capacity being equal to or less than a total value of the chargeable and dischargeable capacities of the target storage batteries; and
   submitting a bid for the frequency control under a bid condition including the bid capacity,
   wherein, when the bid for the frequency control is established, the bid capacity is distributed to at least some of the target storage batteries, and
   wherein the bid capacity is determined to be a capacity a predetermined margin less than the total value of the chargeable and dischargeable capacities of the target storage batteries.

2. The storage battery control method according to claim 1, wherein after distributing the bid capacity, when some of the target storage batteries to which the bid capacity has been distributed become unavailable for the frequency control, the bid capacity is redistributed to at least some of the plurality of storage batteries excluding the target storage batteries that have become unavailable.

3. The storage battery control method according to claim 2, wherein the at least some of the plurality of storage batteries to which the bid capacity is redistributed are the target storage batteries excluding the target storage batteries that have become unavailable.

4. The storage battery control method according to claim 1, wherein the bid capacity is distributed depending on a number of the at least some of the target storage batteries.

5. The storage battery control method according to claim 1, wherein the bid capacity is distributed depending on service lives of the target storage batteries so that a target storage battery with a longer service life is provided with more of the bid capacity, the target storage battery being one of the target storage batteries.

6. The storage battery control method according to claim 1, wherein the bid capacity is distributed depending on frequencies at which the target storage batteries are used for the frequency control so that a target storage battery with a lower frequency for the frequency control is provided with more of the bid capacity, the target storage battery being one of the target storage batteries.

7. The storage battery control method according to claim 1, wherein the bid capacity is distributed depending on the chargeable and dischargeable capacities of the target storage batteries so that a target storage battery with a larger chargeable and dischargeable capacity is provided with more of the bid capacity, the target storage battery being one of the target storage batteries.

8. The storage battery control method according to claim 1, wherein the chargeable and dischargeable capacities are received before the use permission information is received.

9. The storage battery control method according to claim 1, wherein the chargeable and dischargeable capacities are received each time the use permission information is received.

10. The storage battery control method according to claim 1, wherein the chargeable and dischargeable capacities set by a user of the storage batteries are received.

11. The storage battery control method according to claim 1, wherein the frequency control is performed by charging and discharging the target storage batteries to which the bid capacity has been distributed.

12. A storage battery control apparatus comprising:
    one or more memories; and circuitry operative to:
    receive capacity information indicating chargeable and dischargeable capacities of a plurality of storage batteries;
    receive use permission information indicating whether at least some of the plurality of storage batteries are available for frequency control;
    determine target storage batteries to be used for the frequency control, from the at least some of the plurality of storage batteries indicated as available by the received use permission information;
    determine a bid capacity used for the frequency control, the bid capacity being equal to or less than a total value of the chargeable and dischargeable capacities of the target storage batteries; and
    submit a bid for the frequency control under a bid condition including the bid capacity,
    wherein, when the bid for the frequency control is established, the bid capacity is distributed to at least some of the target storage batteries, and wherein the bid capacity is determined to be a capacity a predetermined margin less than the total value of the chargeable and dischargeable capacities of the target storage batteries.

* * * * *